Patented May 21, 1940

2,201,206

UNITED STATES PATENT OFFICE 2,201,206

PRODUCTION OF ANHYDROUS MAGNESIUM CHLORIDE

Walther Schmid, Fritz Wienert, and Hans Georg Lange von Stocmeier, Stassfurt, Germany, assignors, by mesne assignments, to Magnesium Development Corporation, a corporation of Delaware No Drawing. Application January 5, 1939, Serial No. 249,478. In Germany January 22, 1938

5 Claims. (Cl. 23—91)

This invention relates to a process for the production of anhydrous magnesium chloride from magnesium chloride lyes or higher hydrates of magnesium chloride.

The production of anhydrous magnesium chloride from magnesium chloride lye is a problem that has for many years been of considerable economic importance in view of the possibility of producing magnesium, by fusion electrolysis, from the waste products of the potash industry. A technically and economically satisfactory solution of this problem, however, is bound up with considerable difficulties in that the hydrates of magnesium chloride, which form successively as the dehydration progresses, i. e., as the temperature is progressively raised, tend in increasing degree to decompose, by splitting off hydrochloric acid and forming magnesia. It was therefore hitherto considered necessary to effect the conversion of magnesium chloride lye into anhydrous magnesium chloride by a number of successive operative steps, each involving different and progressively more complicated conditions of working. Generally, a lower hydrate of magnesium chloride was first produced by dehydration—this usually involving a number of individual steps— the lower magnesium chloride thus produced being then converted into anhydrous magnesium chloride either by further dehydration in an atmosphere of hydrochloric acid gas or by a treatment with chlorine in the presence of carbon. This manner of procedure is extremely unsatisfactory both as regards the apparatus and the thermal economy of the process, and has resulted in a cost price of anhydrous magnesium chloride produced from magnesium chloride lye which made it impossible for the magnesium metal produced from such anhydrous magnesium chloride by fusion-electrolysis to compete with that of magnesium metal produced by other processes (e. g., from magnesite).

The present invention relates to a two-step process for the production of anhydrous magnesium chloride from higher hydrates of magnesium, especially magnesium chloride hexahydrate, which process obviates the disadvantages of the hitherto known processes. The process of the invention consists in first converting the fused higher hydrate of magnesium chloride into a low hydrate having a low bulk density (i. e., a low weight per unit volume) and high porosity, by spray-drying with hot gases, thereupon moulding said low hydrate into shaped pieces with the admixture of small amounts of carbon but without binding media, and finally treating said shaped pieces disposed on a permeable support, with gaseous chlorine at temperatures adequate for the conversion into anhydrous magnesium chloride.

As compared with the previously known processes for producing lower hydrates from magnesium chloride hexahydrate or magnesium chloride lye, the use of spray-drying leads to a product whose content of water of hydration is either lower with the same MgO-content (which latter is the result of unavoidable partial decomposition), or whose content of water of hydration is the same while the MgO-content is correspondingly reduced. This superior quality of the low hydrate obtained by spray-drying, in turn, results in its being more easily converted into anhydrous magnesium chloride in the subsequent stage of the process. Moreover, the voluminous structure of the low hydrate obtained by spray-drying, which seems to be caused by the presence therein, of a large proportion of extremely fine interlaced crystals, is of advantage in other respects: While in a previous process, in which conversion into anhydrous magnesium chloride was carried out by treating moulded pieces of a mixture of the low hydrate product and carbon, with chlorine, it was necessary to use a binder for forming the briquettes and/or to employ a comparatively large quantity of carbon of special form (imparting a certain porosity to the briquettes on their being dried prior to the treatment with chlorine), the low hydrate obtained by spray-drying enables briquettes to be formed therefrom by mere pressing (i. e. without the application of a special binder) and the conversion into anhydrous magnesium chloride to take place with lesser amounts of carbon, which no longer is required to be of such a kind as, on drying of the briquettes, will produce a porosity of its own. This is so for the reason that the porous nature of the low hydrate produced by spray-drying is substantially retained even when subjecting it to the moulding pressure, and for the further reason that the large total surface area of the voluminous hydrate product produced by spray-drying enables the conversion of the moulded pieces into pure anhydrous magnesium chloride to take place substantially in the solid condition. This circumstance, in conjunction with the smaller content of water of hydration of the low hydrate or the low proportion of magnesia impurity contained therein, in turn enables the height of the irrigation layer, in the process of the present invention, to be considerably reduced by comparison with the earlier process without impairing the anhydrous character and purity of the resulting anhydrous magnesium chloride; in fact, it is even possible, by suitably conducting the process, to employ a simple grid or the like as a permeable support. Nevertheless, preference will be given to an irrigating layer of small height, heated by electrolytic resistance heating, since in this way the apparatus difficulties connected with pre-heating the chlorine outside the furnace are avoided.

The conversion of the magnesium chloride hexahydrate into the low hydrate by spray-drying can be effected in hot air. It has, however, been found particularly convenient from the point of view of heat economy, to carry out the conversion by blowing the molten hexahydrate in concurrent flow with flame gases having a temperature of about 650° C. and more (produced, for example, by burning producer gas), since the recuperator heating of the drying air, otherwise necessary, can thus be dispensed with. In so doing, it has been observed that, despite the presence of considerable amounts of water vapour in the flame gases (which per se should favour a decomposition of the magnesium chloride hydrate) no such decomposition takes place to an appreciable extent. Even when flame gases having a temperature of about 650° to 800° C. are employed, a product is obtained which leaves the spray-drying chamber at a temperature of from 200 to 220° C., and, in respect of its water content, corresponds to magnesium chloride monohydrate, and which in consequence of the extremely short duration of the contact with the flame gases, contains only about 3 to 6% of magnesia. After admixture of about 2 to 3% of carbon and conversion into shaped pieces, this product can be treated with chlorine on a permeable support and thus furnishes anhydrous magnesium chloride directly suitable for electrolysis.

On the other hand, the advantages of the process of converting the low hydrate, for example magnesium chloride monohydrate, into anhydrous magnesium chloride, in accordance with the invention, consist in that, in consequence of the use of the reaction mixture in the form of moulded pieces loosely heaped on the permeable support, the penetration of the chlorine gas ascending through the support is always ensured even when the depth of the layer of material is considerable; in particular, any disturbing bridge formation in the reaction material above the layer is prevented, even when operating continuously.

Instead of fused magnesium chloride hexahydrate, magnesium chloride lyes may naturally be used as originating material and subjected to spray-drying. As a rule, however, it is more advantageous first to evaporate the lyes, in the usual manner, down to magnesium chloride hexahydrate or to a somewhat lower hydrate (if desired to the tetrahydrate), since this may be done without difficulty.

Example

Fused magnesium chloride hexahydrate, produced from the end lyes of the potash industry and containing 47% of $MgCl_2$, 10% of foreign salts ($MgSO_4$, KCl, NaCl) and 43% of water, is sprayed with compressed air at a gauge pressure of 3 atmospheres and a temperature of 190° C. in concurrent flow with gases which have a temperature of 650° C. and are produced by burning producer gas with an excess of air. 500 cubic metres of compressed air (760 mm. Hg at 20° C.) and 400 cubic metres of producer gas of 1350 Kcals. are used for spraying 1000 kgs. of melt in one hour. The outgoing gases leave the spray drying chamber at a temperature of 220° C., and the dried product is separated in a centrifugal dust separator. It consists of 68% of $MgCl_2$, 15% of foreign salts ($MgSO_4$, KCl, NaCl), 5% of MgO and 12% of water and is of an extremely porous character (bulk density 400 grms. per litre).

In order to produce anhydrous magnesium chloride, the product is mixed with about 3% of carbon (brown coal briquette dust) and moulded into shaped pieces by using a pressure of 60 kgs. per square cm. These shaped pieces are then charged a portion at a time, into a chlorinator provided with ceramic lining, on to an electrically heated permeable support, through which chlorine gas is passed from below.

The reaction proceeds without interruption, anhydrous magnesium chloride running off through the support and being drawn off, as needed, from the bottom part of the reaction chamber for direct use for the electrolysis.

We claim:

1. In a process for the production of anhydrous magnesium chloride from that group of magnesium chloride containing substances which consists of aqueous solutions of magnesium chloride and hydrates of magnesium chloride containing at least about two molecules of $H_2O$ for every molecule of $MgCl_2$, the steps of first spray-drying the said magnesium chloride containing substances, in liquid or molten condition, by contact with hot gases so as to convert them into a magnesium chloride hydrate whose water content is less than about 2 mols of $H_2O$ for every mol of $MgCl_2$, moulding said low hydrate into shaped pieces with admixture of small amounts of a reducing agent, and finally treating said shaped pieces with gaseous chlorine so as to convert them into anhydrous magnesium chloride.

2. In a process for the production of anhydrous magnesium chloride from that group of magnesium chloride containing substances which consists of aqueous solutions of magnesium chloride and hydrates of magnesium chloride containing at least about two molecules of $H_2O$ for every molecule of $MgCl_2$, the steps of first spray-drying the said magnesium chloride containing substances, in liquid or molten condition, by contact with hot gases so as to convert them into a magnesium chloride hydrate whose water content is less than about 2 mols of $H_2O$ for every mol of $MgCl_2$, moulding said low hydrate into shaped pieces with admixture of small amounts of carbon, and finally treating said shaped pieces with gaseous chlorine so as to convert them into anhydrous magnesium chloride.

3. In a process for the production of anhydrous magnesium chloride from that group of magnesium chloride containing substances which consists of aqueous solutions of magnesium chloride and hydrates of magnesium chloride containing at least about two molecules of $H_2O$ for every molecule of $MgCl_2$, the steps of first spray-drying the said magnesium chloride containing substances, in liquid or molten condition, by contacting said sprayed substances with hot gases having a temperature of about 650° C. so as to convert them into a magnesium chloride hydrate whose water content is less than about 2 mols of $H_2O$ for every mol of $MgCl_2$, molding said low hydrate into shaped pieces with admixture of small amounts of a reducing agent, and finally treating said shaped pieces with gaseous chlorine so as to convert them into anhydrous magnesium chloride.

4. In a process for the production of anhydrous magnesium chloride from that group of magnesium chloride containing substances which consists of aqueous solutions of magnesium chloride and hydrates of magnesium chloride containing at least about two molecules of $H_2O$ for every molecule of $MgCl_2$, the steps of first spray-drying the said magnesium chloride containing substances, in liquid or molten condition, by contacting them with hot flame gases having a temperature of about 650° C. so as to convert them into a magnesium chloride hydrate whose water content is less than about 2 mols of $H_2O$ for every mol of $MgCl_2$, moulding said low hydrate into shaped pieces with admixture of small amounts of a reducing agent, and finally treating said shaped pieces with gaseous chlorine so as to convert them into anhydrous magnesium chloride.

5. In a process for the production of anhydrous magnesium chloride from that group of magnesium chloride containing substances which consists of aqueous solutions of magnesium chloride and hydrates of magnesium chloride containing at least about two molecules of $H_2O$ for every molecule of $MgCl_2$, the steps of first spray-drying the said magnesium chloride containing substances, in liquid or molten condition, by contact with hot gases so as to convert them into a magnesium chloride hydrate whose water content is less than about 2 mols of $H_2O$ for every mol of $MgCl_2$, moulding said low hydrate into shaped pieces with admixture of small amounts of a reducing agent, and finally treating said shaped pieces, disposed on a permeable support, at temperatures above the melting point of anhydrous magnesium chloride with gaseous chlorine supplied from below so as to contact the down-flowing magnesium chloride with chlorine gas.

WALTHER SCHMID.
FRITZ WIENERT.
HANS GEORG LANGE v. STOCMEIER.